(No Model.)
A. E. ELLINWOOD.
BELT STRETCHING MACHINE.
No. 438,286. Patented Oct. 14, 1890.
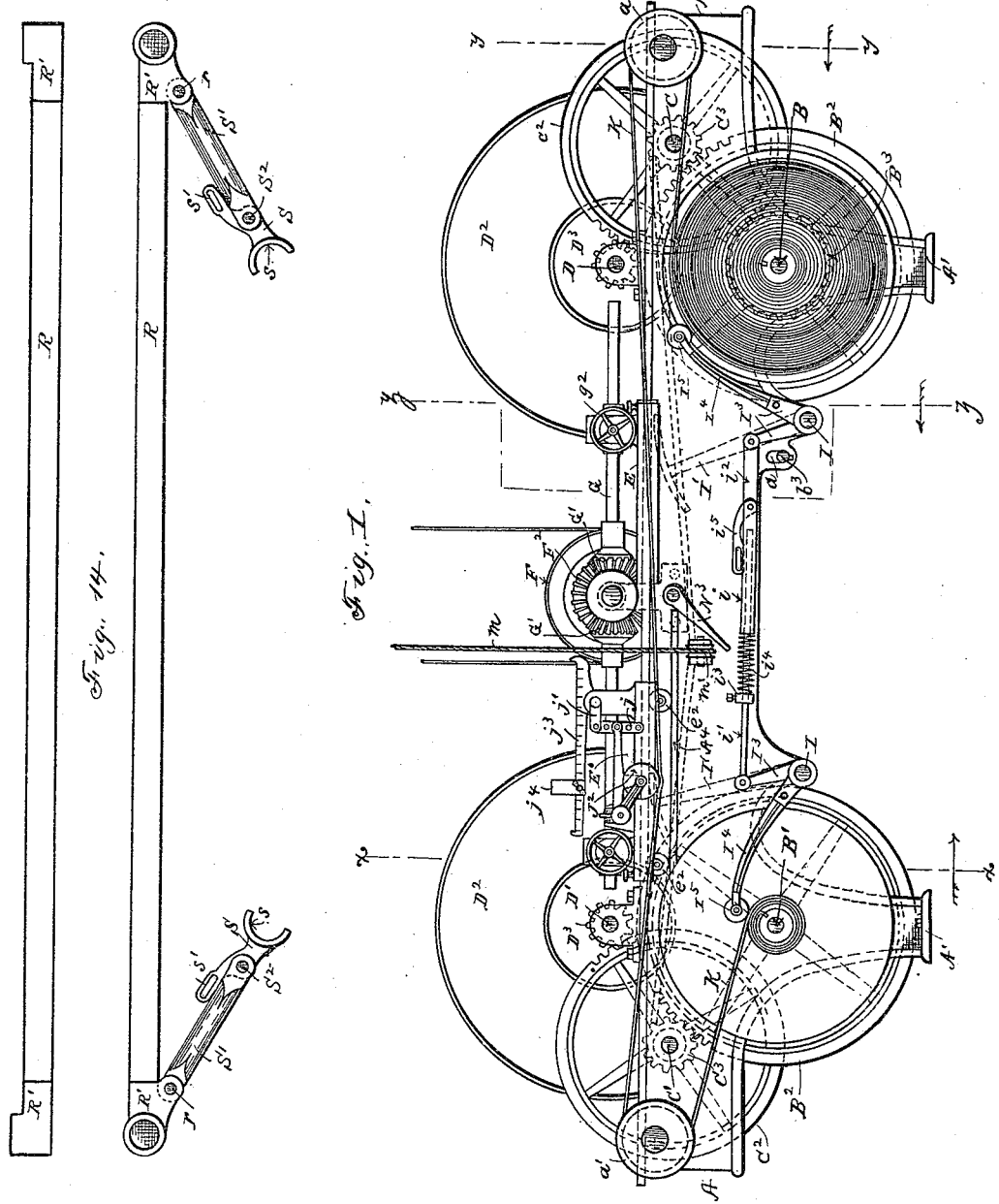
Witnesses
W. R. Edelen
Geo. W. King
Inventor
Augustus E. Ellinwood
By Attorneys
Leggett & Leggett

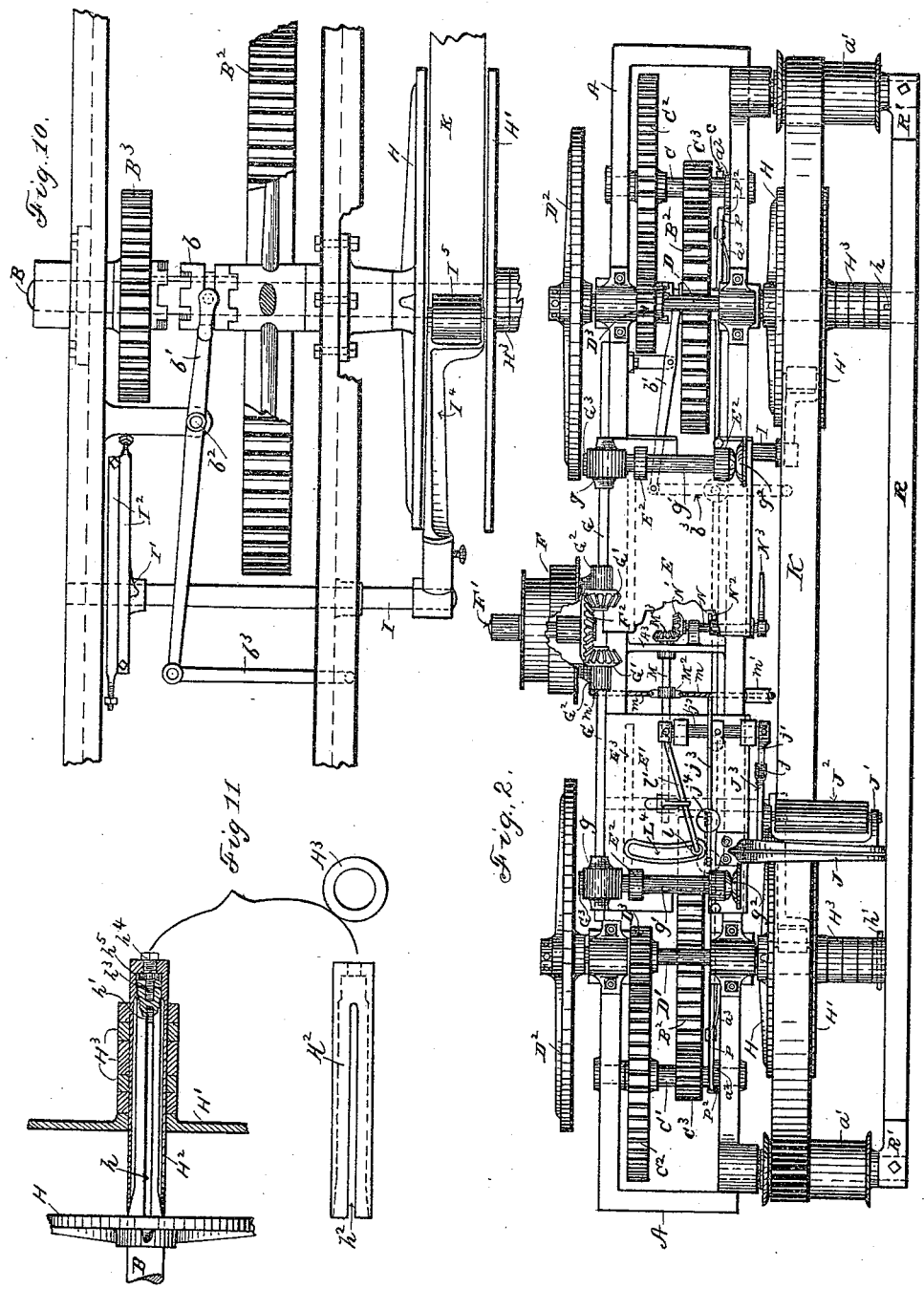

(No Model.)
A. E. ELLINWOOD.
BELT STRETCHING MACHINE.
No. 438,286. Patented Oct. 14, 1890.
6 Sheets—Sheet 3.
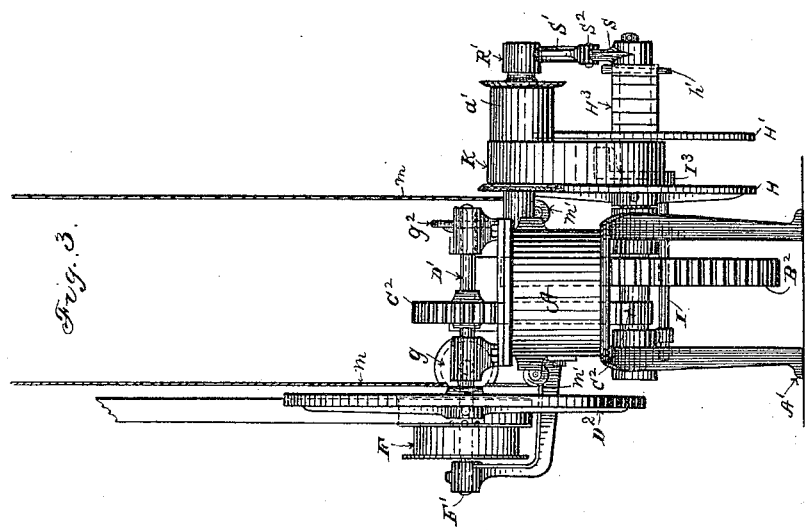
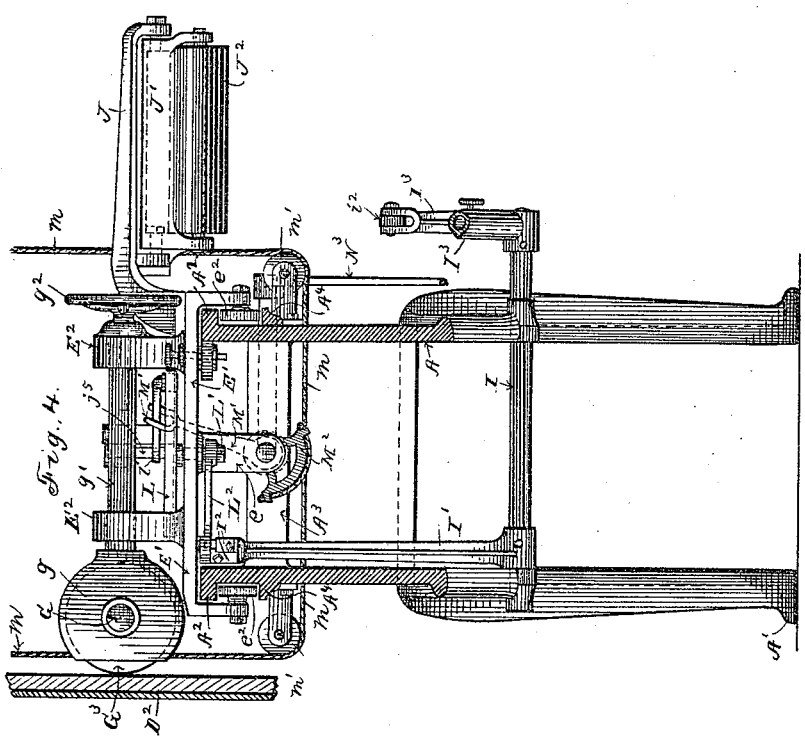
Witnesses
W. R. Edelen.
Geo. W. King.
Inventor
Augustus E. Ellinwood
By Attorneys
Leggett & Leggett (No Model.) 6 Sheets—Sheet 4.
A. E. ELLINWOOD.
BELT STRETCHING MACHINE.
No. 438,286. Patented Oct. 14, 1890.
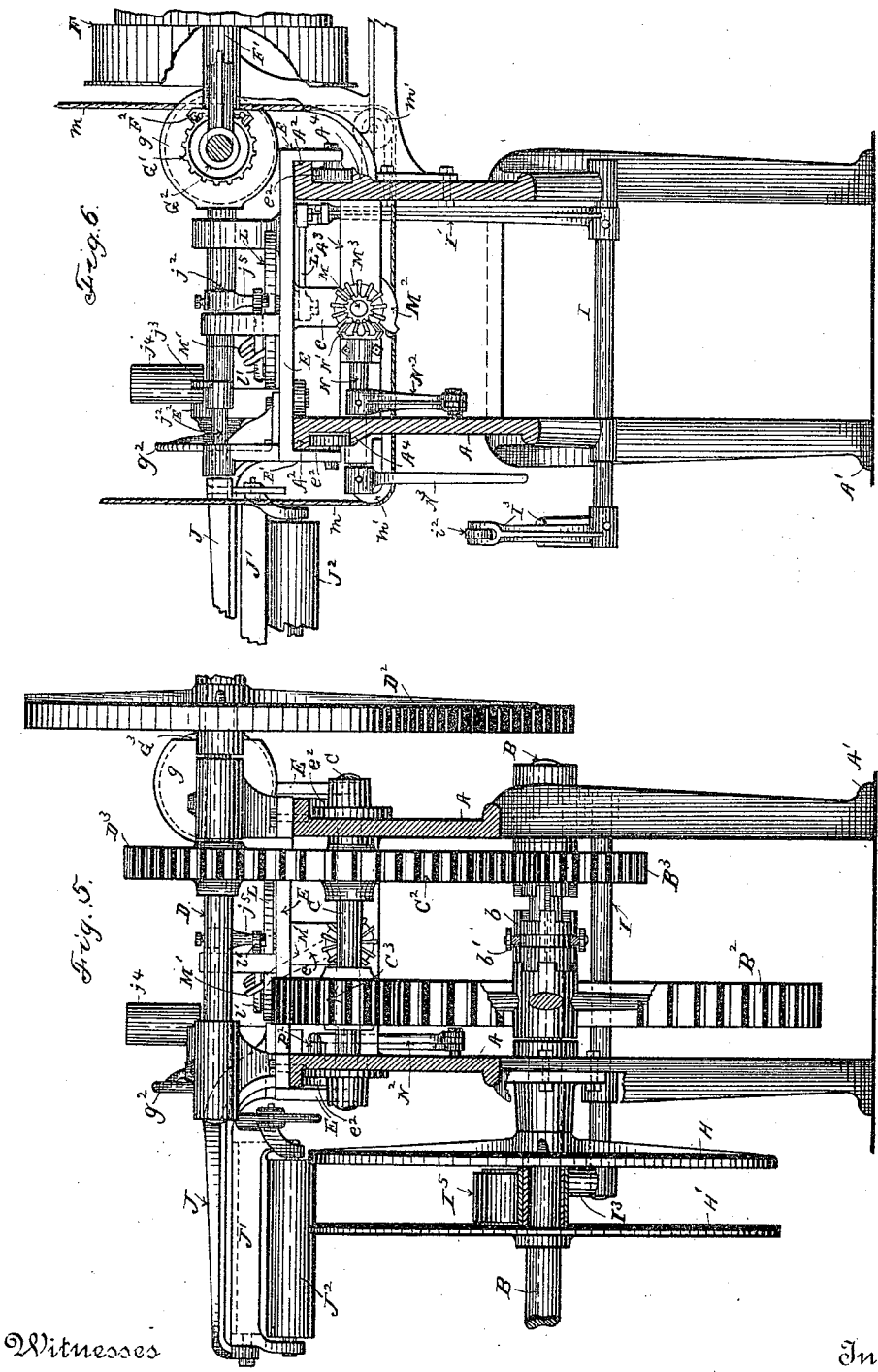

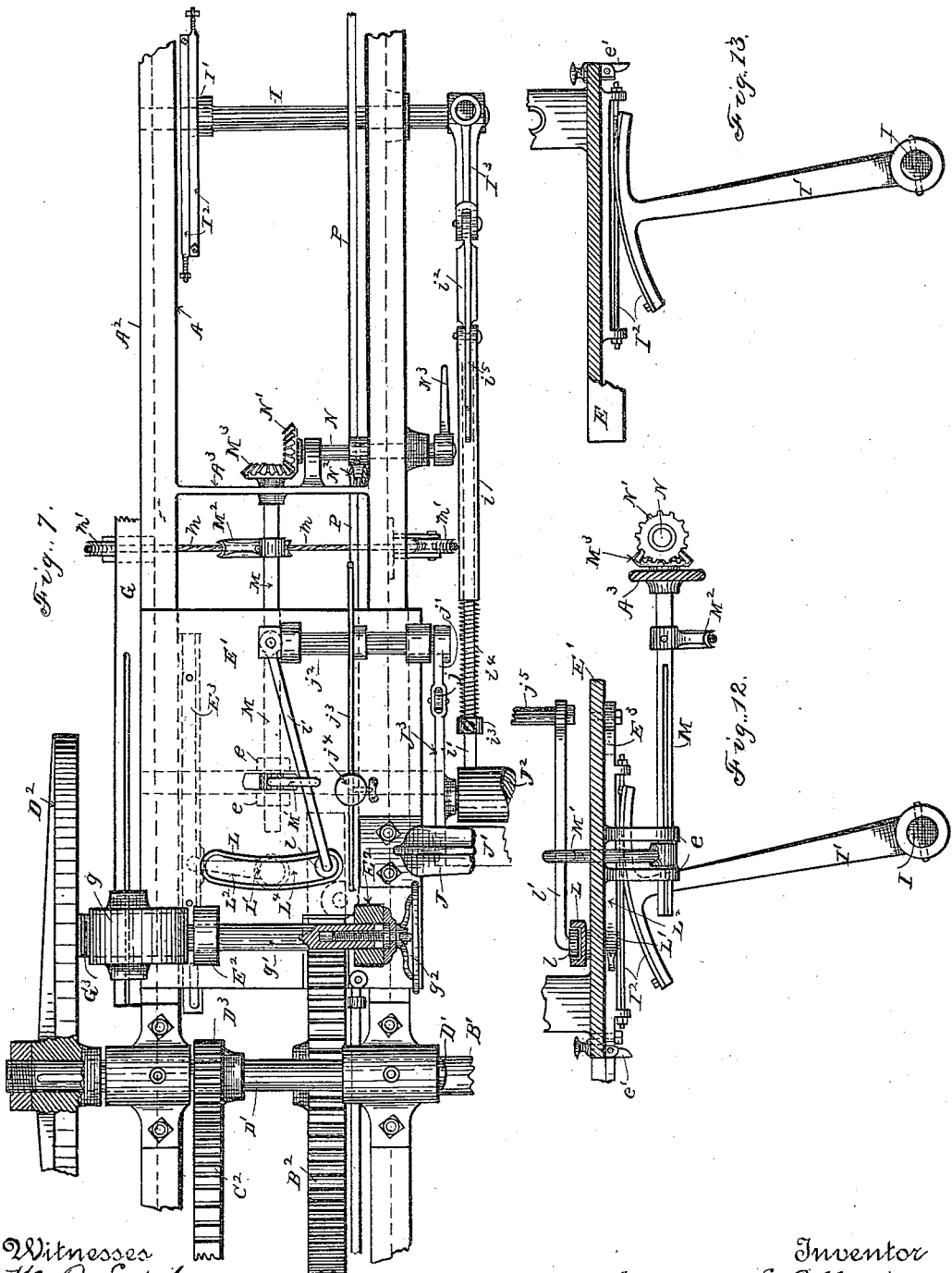

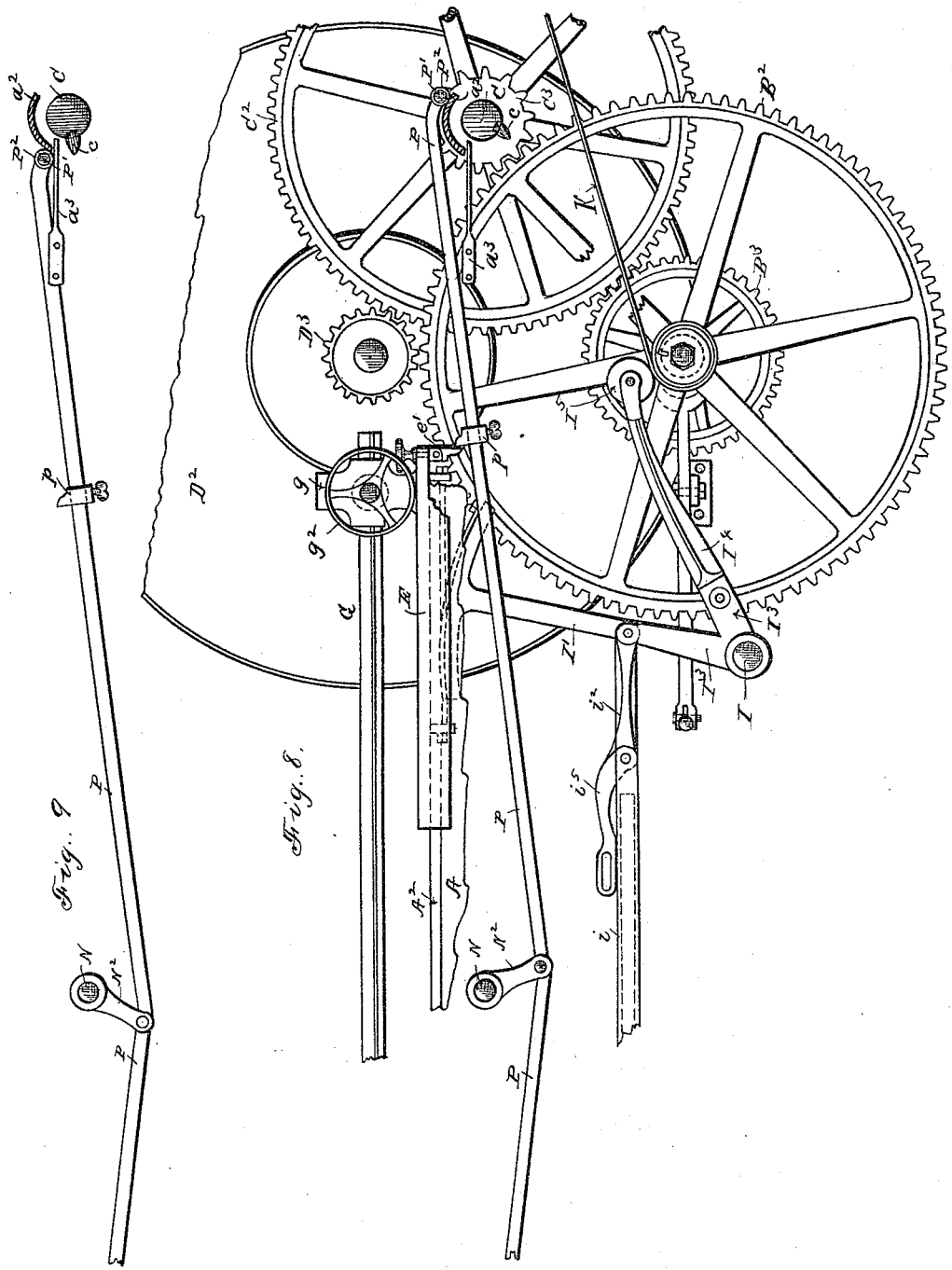

UNITED STATES PATENT OFFICE.

AUGUSTUS E. ELLINWOOD, OF AKRON, OHIO.

BELT-STRETCHING MACHINE.

SPECIFICATION forming part of Letters Patent No. 438,286, dated October 14, 1890.

Application filed March 13, 1890. Serial No. 343,723. (No model.)

*To all whom it may concern:*

Be it known that I, AUGUSTUS E. ELLINWOOD, of Akron, in the county of Summit and State of Ohio, have invented certain new and useful Improvements in Automatic Belt-Stretching Machines; and I do hereby declare the following to be a full, clear, and exact description of the invention, such as will enable others skilled in the art to which it pertains to make and use the same.

My invention relates to improvements in automatic belt-stretching machines, the same including a governing device for regulating the tensile strain applied to the belt and for taking up the slack of the belt caused by stretching the latter; also, automatic reversing mechanism for the machine is provided.

My invention also relates to the details of construction hereinafter described and pointed out in the claims.

In the accompanying drawings, Figure 1 is a side elevation. Fig. 2 is a plan, portions being broken away to show the construction. Fig. 3 is a left-hand end elevation. Fig. 4 is an end elevation on section-line $xx$, Fig. 1. The figures from 4 to 13, inclusive, are enlarged. Fig. 5 is a right-hand end elevation, partly in section. Fig. 6 is an elevation in transverse section on line $zz$, Fig. 1. Fig. 7 is a plan in detail of the left-hand portion of the machine. Fig. 8 is a side elevation of the right-hand portion of the machine, showing more especially the reversing mechanism. Fig. 9 is a detail of shaft and rod in reverse positions relative to Fig. 8. Fig. 10 is a plan of the clutch mechanism. Fig. 11 shows longitudinal section, plan, and end view, in detail, of sleeve and connected mechanism. Fig. 12 is a side elevation, in section, of the governing mechanism. Fig. 13 is an elevation in section of the right-hand carriage or table E'. Fig. 14 shows a side elevation and plan, in detail, of arm and attachments. Fig. 15 is a side elevation of arm and attachments.

A represents a suitable supporting frame or bed for accommodating the mechanism hereinafter mentioned, this structure being supported on legs A'. Frame A is provided with suitable boxes, in which are respectively journaled the transverse shafts B B', C C', and D D'; also, the top edge of the head or frame is provided with ways $A^2$, on which tables E E' may reciprocate lengthwise of the machine.

F' is the driving-shaft, provided with cone-pulley F for regulating the speed of the machine, this shaft being also provided with beveled gear $F^2$ for engaging, in common, bevel-gears G' G', the latter being mounted, respectively, on shafts G G, these shafts being in line with each other and extending lengthwise of the machine and located near the rear side of the machine. Shafts G G at their inner ends are journaled in stationary boxes $G^2$ $G^2$, connected with bed A, and these shafts are further supported by movable journal-boxes $g$ $g$. These latter boxes are chambered and serve as housings for friction-wheels $G^3$ $G^3$, that engage, respectively, the faces of the large friction-disks $D^2$, the latter being mounted, respectively, on shafts D D', aforesaid.

Friction-wheels $G^3$ $G^3$ are mounted with an easy fit on the respective shafts G G, these shafts being provided with longitudinal grooves, and wheels $G^3$ $G^3$ are provided with splines adapted to operate in these grooves, whereby the friction-wheels are caused to revolve with the respective shafts, but may slide endwise thereon. These combined boxes and housings $g$ $g$, that embrace the friction-wheels $G^3$, are mounted on bars $g'$ $g'$, that may slide endwise through bearings $E^2$, connected with the respective tables E E' with hand-screws $g^2$ $g^2$ (see Figs. 2 and 7) for adjusting bars $g'$ $g'$ in the direction toward or from disks $D^2$, to regulate the pressure of friction-wheels $G^3$ $G^3$, respectively, against the friction-disks. With the construction just described it is evident that by reciprocating either table E E' along ways $A^2$ the accompanying friction-wheels $G^3$ will be made to travel in a radial direction along the face of the engaging-disk $D^2$. Hence the relative speed with which the respective disks $D^2$ revolve is controlled by the movement of the respective tables E E'. Shafts B B' overhang the supporting-frame on the front side thereof, and on these overhanging sections of these shafts are mounted disks H H and other appliances, hereinafter mentioned, for winding the belt, and for actuating these shafts the following transmitting mechanism is employed, to wit:

On shaft D D' are mounted, respectively, pinions $D^3$, engaging gears $C^2$ of the respective shafts C C', these latter shafts having, respectively, pinions C³, that engage gears B², mounted, respectively, on shafts B B'. The gear B² of shaft B' is rigidly mounted thereon, while gear B² of shaft B is mounted loosely on the shaft, as is also a smaller gear B³, the latter engaging direct with the opposing gear C². The opposing ends of the hub of gears B² B³ of shaft B are provided with jaws for engaging the corresponding jaws of sleeve $b$, (see Fig. 5,) thus constituting a double so-called "grab-clutch." Sleeve $b$ is adapted to slide endwise on the shaft, but is caused to revolve with the shaft by means of the well-known appliance of groove and spline. This sleeve is shifted by means of forked lever $b'$, pivoted at $b^2$, a rod $b^3$ connecting with the lever, as shown, and extending out through a hole $a$ of the bed to where it is conveniently operated in shifting the clutch. With sleeve $b$ in position clutching gear B³ a comparatively fast movement is imparted to shaft B for the initial winding of the belt thereon. Belt K, that is to be stretched, having been wound on the attachments of sleeve B, the belt is passed over idle-drums $a'\ a'$, and from thence the belt leads to and is fastened to attachments of shaft B', after which sleeve $b$ is shifted to clutch gear B², whereby a comparatively slow movement is imparted to shaft B, the latter in such case being actuated by mechanism corresponding with the transmitting mechanism of shaft B'.

The appliances for attaching the belt to the respective shafts B B' are alike and are as follows: As aforesaid, each of these shafts has rigidly mounted thereon a broad disk or flange H, and just outside the disk the shaft is conical for a short section, and from thence the reduced end section thereof is approximately cylindrical. The overhanging section of the shaft is provided with a long slot $h$, provided with a transverse key $h'$. A sleeve H² has an easy fit on the shaft, this sleeve having a slot $h^2$, extending to the inner end of the sleeve. On sleeve H² is mounted a disk H' with an easy fit, so that the disk may be adjusted lengthwise the sleeve. Disk H' is adjusted toward and from disk H, according to the width of belt K that is to be stretched, disk H' being held in its adjusted position by backing-rings H³. These rings have an easy fit on sleeve H² and are held in position by the protruding end of key $h'$, the latter extending through the slot of the sleeve, whereby the latter is made to turn with the shaft. A screw $h^3$ is provided with a head $h^4$ on the outside and with a collar $h^5$ on the inside of the head of the sleeve, this screw engaging a threaded hole in the end of the shaft. This screw is used for drawing on and backing off the sleeve for a short distance, where the conical section of sleeve and shaft engage each other, after and before which the sleeve is readily slid on or off of the shaft by hand. The end of the belt is inserted in slot $h^2$ of the sleeve of shaft B, and the belt is wound on the sleeve in the manner aforesaid, and after passing the belt over drum $a'\ a'$ the other end of the belt is inserted in slot $h^2$ of the sleeve of shaft B'. The belt may then be unwound from one shaft and wound on the other shaft, and then by reversing the machine the belt may be passed back to the first shaft, and so on, back and forth, until the belt has been properly stretched, after which the sleeve on which the finished belt is coiled is first loosened by means of screw $h^3$ and is then removed by hand. Next the key-ring and disk H' are removed, after which the coil of belting is easily removed from the shaft.

It is evident that whenever the two coils of the belt on shaft B B' are equal in size, in order that the one shaft shall wind up the belt as fast as the other shaft unwinds the belt, the two shafts must revolve at the same speed, and that as one coil diminishes and the other coil increases in size the motion of the shaft bearing the diminishing coil should be accelerated and the shaft bearing the increasing coil should be retarded, and that the speed of each shaft should increase inversely as its coil of belt decreases, and vice versa. As aforesaid, the speed of shafts B B' are respectively varied by shifting friction-wheels G³ in a radial direction along the engaging-disks D² D², such results being attained by moving the respective tables along ways A². To automatically operate these tables to produce the desired results, I provide as follows:

I I are rock-shafts, each bearing an upright rock-arm I', the same terminating above in a sector. (See Figs. 1, 12, and 13.) To the extremes of a sector are attached flexible straps I², usually of thin steel, these straps leading in opposite directions and attaching to the adjacent table or to an attachment of such table, so that by oscillating these arms the connected tables are reciprocated endwise. On the forward ends of shafts I I are mounted, respectively, rock-arms I³ of the bell-crank variety, arranged in the reverse order shown, the upright members thereof being connected, such connecting device consisting of tubes $i$ and rods $i'\ i^2$. Rod $i'$ is adapted to telescope in the tube, the rod being provided with an adjustable collar $i^3$, and between the end of the tube and the collar is located a stiff spring $i^4$, coiled around this rod and bearing against the collar and tube, whereby is had a slip-joint, the tension of the spring tending to extend the joint. Rod $i^2$ is pivoted to the one end of tube $i$, this rod being offset and having a section $i^5$, that overlaps the tube to hold the parts in line, the extension $i^5$ serving as a handle, by raising which the joint is deflected and the connecting-rod thereby shortened, whereby the upright members of rock-arms I³ are made to approach each other. The lateral members of rock-arms I³ are cored to receive, respectively, the shanks of the detachable extension-arms I⁴, the latter being provided, respectively, with rollers I⁵, adapted to bear and travel on the respective belt-coils, By adjusting collar $i^3$ the tension of spring $i^4$ is regulated, so that rollers $I^5$ bear with sufficient force against the belt-coils and at the same time the compression or recoil of the spring will compensate for any irregularity in the belt. In Fig. 1 the right-hand roller $I^5$ is shown engaging approximately a maximum-sized belt-coil, and the right-hand friction-roller $G^3$ is near the periphery of the coöperating disk $D^2$. As the belt-coil borne by shaft B gradually decreases in size, roller $I^5$ gradually approaches shaft B, and in so doing will slowly shift friction-wheel $G^3$ toward the center of the engaging-disk $D^2$. On the other hand, the increasing belt-coil on shaft B′ gradually elevates the left-hand roller $I^5$, and thereby shifts the left-hand friction-wheel $G^3$ toward the periphery of the left-hand disk $D^2$. With the reverse movement of the machine the reverse movement of roller $I^5$ causes reverse movements of the tables and friction-wheels $G^3$.

For stretching the belt, I provide an arm J, connected with, for instance, the left-hand table E′. This arm extends over the line of the belt and has pivoted thereto a swinging frame J′, the latter bearing a heavy gravity-roller $J^2$, this roller being adapted to ride on the belt as the latter is passing from one drum $a$ to the other drum. Frame J′ has an extension or arm $J^3$, that is connected by means of link $j$ with rock-arm $j'$, the latter being mounted on rock-shaft $j^2$. This shaft is journaled in boxes connected with table E′; but the shaft is elevated some little distance above the table. Shaft $j^2$ bears a lateral graduated lever $j^3$, that corresponds with a scale-beam, and is provided with adjustable poise $j^4$. By adjusting this poise along the graduated lever, the pressure of roller $J^2$ on the belt is increased or diminished, according to the width of the belt. It will be noticed that lever $J^3$ extends a short distance to the right hand of its supporting-shaft, so that the poise can be adjusted to partially counterbalance roller $J^2$—for instance, in case of a very narrow belt.

With the mechanism as thus far described there has been no provision for taking up the slack of the belt caused by the stretching of the belt. Of course some portions of the belt will stretch more than other portions, so that it cannot be predetermined with any accuracy how much the entire belt will stretch, or how much any particular section of the belt will stretch.

To take up the slack of the belt caused by stretching that section of the belt that is passing from one drum $a'$ to the other, I provide an automatic governor that so far controls the movement of shaft B′, by increasing the speed of this shaft while the belt is winding thereon and by decreasing the speed of this shaft while the belt is being wound on shaft B with the reverse movement of the machine, that such variations of shaft B′ are at all times just sufficient to take up the slack caused by stretching the belt. This governing mechanism is as follows: The flexible straps $I^2$ of the left-hand rock-arm and sector I′ do not connect directly with table E′, but instead connect with bar $E^3$, the latter being bolted to the under side of this table, the securing-bolts thereof operating in longitudinal slots of the bar, so that the bar may slide endwise of the table a limited distance. A link L at the longitudinal center thereof has a depending trunnion L′, that extends through and is journaled in the vertical hole in the table, thus constituting a pivotal bearing for the link, whereon the link may oscillate. Below the table an arm $L^2$ at one end thereof is rigidly secured to the trunnion, the other end of this arm being pivotally connected with bars $E^3$, preferably by means of the arm entering a mortise or pocket in the bar, as shown more clearly at $L^4$, Fig. 7. With such construction it is evident that if the table be reciprocated along the bar $E^3$ the link will be oscillated thereby; and, conversely, if the link be oscillated it will reciprocate the table along the bar. The link is provided with a curved longitudinal slot or recess $L^4$, and therein operates a roller $l$ or sliding block, if preferred, such roller or sliding block, as the case may be, being operatively connected with the push-bar $l'$. The latter is pivotally connected with arm $j^5$, depending from shaft $j^2$, the joint between this arm and push-bar being a little loose, so that not only the push-bar may swing laterally on the arm, but the arm may vibrate the limited distance necessary without cramping. Push-bar $l'$ is held in its forward or rearward position, so as to connect either with the forward or rearward end of the link by means of a forked arm M′, connected with the shifting mechanism, hereinafter described. Roller $J^2$, as it engages the belt, will descend, more or less, according as the engaging section of the belt stretches more or less, and as some sections of the belt will stretch more than other sections roller $J^2$ will consequently have a variable up-and-down movement, and by means of the connecting mechanism just described such up-and-down movement of this roller will actuate link L, and thereby shift the table endwise relative to bar $E^3$.

Suppose the machine be running in the direction to wind the belt on shaft B′, in which case the relation of parts is such that the push-bar $l'$ will connect with the forward end of link L. In such position of parts the downward movement of the roller $J^2$ will shift the connected table toward the left hand, thereby increasing the speed of the shaft B′, thus taking up the extra length of belt caused by stretching. Meantime this table is being moved gradually toward the right hand by the increasing coil of belt on shaft B′, in a manner already described, so that the effect of the governing mechanism just described is to cause the table to lag behind or maintain a position a little farther toward the left hand than it would otherwise do, whereby the speed of shaft B' is slightly increased. When the belt shall have been wound on shaft B', the left-hand friction-wheel G³ will have reached a position near the periphery of the left-hand disk D², and when this occurs the machine, by means of mechanism hereinafter described, is automatically reversed, so as to wind the belt back upon shaft B, and in thus reversing the machine push-bar $l'$ is shifted to its rearward position. With such position of parts, as the coil of belt on shaft B' diminishes in size, table E' will be slowly moved toward the left hand, in which case the action of the governor will cause the table to lag behind or maintain a position farther toward the right hand than it would otherwise do, whereby the movement of shaft B' is retarded, so that shaft B takes up the slack caused by further stretching the belt by the second winding thereof.

The automatic reversing mechanism is as follows: M is a rock-shaft extending lengthwise the machine, the one end thereof being supported by cross-bar A³ of the bed. The other end of the rock-shaft is supported by lugs $e\,e$, depending from table E'. Mounted on this rock-shaft and operating between lugs $e\,e$ is located the forked arm M' aforesaid for shifting push-bar $l'$. This arm M' has an easy fit on the rock-shaft, so that it may slide endwise thereon, so as to move in unison with table E' by reason of the embracing-lugs $e\,e$. The shaft is provided with a longitudinal groove, and the arm is provided with a spline adapted to fit in such groove, whereby the rock-arm is caused to move with the rock-shaft. On this rock-shaft is mounted segmental wheel or sheave M², to the extremes of which are attached cords $m\,m$, leading in opposite directions and passing around idle-sheaves $m'\,m'$, the latter being supported from the bed A. From thence cords $m$ lead to and operate a belt-shifter, (not shown,) by means of which the machine is reversed. On shaft M is also mounted bevel-gear M³, engaging bevel-gear N', the latter being mounted on shaft N. Shaft N is provided with a depending arm N² and with a reversing-lever N³. To arm N² are pivoted rods P P, leading in opposite directions. (See Fig. 8.) The two arms and the mechanism for actuating the same are alike, except that they are arranged in reverse order, and a description of one will therefore serve for both, the right-hand rod and co-operating mechanism being shown in large size in Fig. 8. Rod P at the free end thereof is provided with a lateral stud P', the same extending toward the adjacent sides of bed A. On this stud is mounted a small roller P². The adjacent side of bed A is provided on the inside thereof with an inwardly-projecting curved shelf or rest $a^2$, adapted to engage roller P². This shelf does not extend inward far enough to interfere with rod P. Hence this rod may move up and down past the inner edge of this shelf. The elevated position of rod P is shown with roller P² resting on top of the shelf, and while the belt is being wound from shaft B to shaft B' roller P² is located, as shown, near the right-hand end of the shelf. Each rod P is provided with a collar $p$, and each table E E' is provided with a dog $e'$ for engaging the opposing collar, these dogs being adjustable lengthwise the respective tables. Shafts C C' are each provided with a toe or cam $c$, operating in the same vertical plane as the opposing roller P². Bed A is provided with springs $a^3$, that are offset inward, so as to be out of the way of roller P², these springs being adapted to engage, respectively, rods P in the depressed position of the latter. While the belt K is being wound from shaft B the right-hand rod P will remain in the position shown in Fig. 8, with roller P² thereof, resting on shelf $a^2$ near the right-hand or outer end of the shelf. Meantime the left-hand rod P will be in position with its roller P² near the inner or right-hand end of its shelf $a^2$. When the belt K shall have been nearly unwound from shaft B and table E has consequently nearly reached the extreme of its movement toward the right hand, dog $e'$ engages the opposing collar $p$, and by such engagement moves the right-hand rod P toward the right hand, so that its roller P² is disengaged or pushed off of its shelf and descends by gravity, so that roller P² is within the reach of the opposing cam $c$. Shaft C meantime is revolving in the direction of the arrow. Hence as this cam comes on top of the shaft the cam engages roller P² and pushes the latter toward the left hand, thereby reversing the machine, and in so doing roller P² is passed under and past its shelf $a^2$. As roller P² passes off from the right-hand end of the shelf, as aforesaid, rod P in its descent engages and compresses the opposing spring $a^3$, and as the head of the rod adjacent the stud thereof engages the spring the latter is still further compressed, so that as roller P² passes from under the shelf the recoil of the spring elevates the rod, whereby with the reverse movement of this rod, caused by the reversing mechanism at the other end of the machine, the right-hand roller P² again mounts on top the shelf and returns to the place of beginning. (Shown in Fig. 8.) With this construction the machine automatically reverses whenever the belt is nearly unwound from either shaft B or B', and at the same operation the governing mechanism is reversed in the manner aforesaid. Belt K is therefore passed from one shaft to the other until it has been properly stretched, the machine meantime requiring no attendance.

R is a brace-bar having heads R' bored to fit the protruding ends of the shafts on which the drums $a\,a'$ are mounted. To heads R' are pivoted, at $r$, jointed arms comprising members S S', pivotally connected at S². Member S has a forked end $s$, adapted, respectively, to fit the forward sections of shafts B B'. Members S have offset sections $s'$, that overlap members S' to hold the two sections of the arms in line with each other. Members $s'$ serve, also, as handles for deflecting the joints in loosening these arms in placing or removing the device from the machine. This mechanism supports the different engaging-shafts as against the tensile strain of the belt, which with broad belts is very great.

Tables E and E' may be provided with rollers $e^2$, adapted to travel on ledges $A^4$ of bed A to render these tables as nearly frictionless as possible, in which case ways $A^2$ only serve as guides for these tables.

What I claim is—

1. A belt-stretching machine having opposing shafts for winding the belt thereon from one shaft to the other, combined with variable driving mechanism for each shaft, such driving mechanism being operatively connected, respectively, with rollers adapted to engage the periphery of the respective belt-coils of the two shafts and connected with the variable driving mechanism, the arrangement being such as to vary the speed of each shaft inversely as its belt-coil increases or diminishes in diameter, substantially as set forth.

2. The combination, with opposing shafts adapted to wind the belt from one shaft to the other, rock-arms bearing rollers adapted, respectively, to engage the periphery of the belt-coils of the respective shafts, of a spring-actuated extension-rod connecting such rock-arms, such rock-arms being operatively connected with a variable driving mechanism of the belt-winding shafts, substantially as set forth.

3. The combination, with opposing belt-shafts adapted to wind and unwind the belt from the one shaft to the other, friction-disks, and engaging friction-wheels for driving the respective belt-winding shafts, of reciprocating tables bearing, respectively, the friction-wheels, such tables being operatively connected with rock-arms bearing rollers adapted to engage the periphery of the belt-coils of the respective shafts, substantially as set forth.

4. In a belt-stretching machine, in combination, a shaft having a slotted section overhanging the journal-bearings of the shaft, a slotted sleeve adapted to fit thereon, opposing inside and outside disks, the former being mounted rigidly on the shaft, the latter being mounted loosely on the sleeve, rings for adjusting the outer disk toward and from the inner disk, and a key operating in the slots of the shaft and sleeve, such key being adapted to engage the outer ring, substantially as set forth.

5. The combination, with opposing belt-winding shafts, substantially as indicated, of a swinging frame bearing a roller adapted to engage the belt in the passage of the belt from one shaft to the other, and a scale-beam and poise, the former being operatively connected with the swinging frame for regulating the pressure of the roller on the belt, substantially as set forth.

6. In a belt-stretching machine, the combination, with opposing belt-winding shafts having variable driving mechanism, and a swinging frame bearing a roller adapted to bear upon the belt for stretching the latter, of a governing device for operatively connecting the swinging frame with the variable driving mechanism, whereby the speed of the belt-winding shafts is regulated to take up the belt-slack caused by stretching, substantially as set forth.

7. In a belt-stretching machine, the combination, with opposing belt-winding shafts having variable driving mechanism, and a swinging frame having a roller adapted to ride upon the belt for stretching the latter, of a governor for operatively connecting the swinging frame with the variable driving mechanism, such governor including a reversing-link, substantially as set forth.

8. In a belt-stretching machine, the combination, with a swinging frame bearing a roller adapted to engage the belt for stretching the latter, and a lever and poise for regulating the pressure of such roller upon the belt, of a governor operatively connected with such swinging frame and adapted thereby to vary the speed of the belt-winding shafts according to the stretch of the belt, substantially as set forth.

9. In a belt-stretching machine, the combination, with a belt-winding shaft provided with variable driving mechanism, including reciprocating tables bearing friction-wheels, of push-bars extending in opposite directions, shelves adapted to hold the push-bars elevated and inoperative, springs for elevating the push-bars, cams for actuating the push-bars alternately in opposite directions, and dogs connected with the respective tables for moving the push-bars from off the shelves to engagement with the respective cams, such push-bars being operatively connected with the belt-shifting mechanism for reversing the machine, substantially as set forth.

10. In a belt-stretching machine, the combination, with a belt-winding shaft and stretching device having a reversible governor, of mechanism, substantially as indicated, for reversing the machine, such machine-reversing mechanism being operatively connected with the reversing mechanism of the governor, whereby the machine and governor reverse simultaneously, substantialy as set forth.

In testimony whereof I sign this specification, in the presence of two witnesses, this 27th day of February, 1890.

AUGUSTUS E. ELLINWOOD.

Witnesses:
C. H. DORER,
WILL B. SAGE.